(12) United States Patent     (10) Patent No.:   US 12,657,418 B2

Gunsberg     (45) Date of Patent:    Jun. 16, 2026

(54) HIGH TEMPERATURE RFID TAG HOLDER AND ATTACHMENT COMPONENT

(71) Applicant: Tempo Technologies LLC, Oak Park, MI (US)

(72) Inventor: Gabriel Gunsberg, Brookline, MA (US)

(73) Assignee: Gabriel Gunsberg, Brookline, MA (US)

( * ) Notice: Subject to any disclaimer, the term of this patent is extended or adjusted under 35 U.S.C. 154(b) by 0 days.

(21) Appl. No.: 19/049,410

(22) Filed: Feb. 10, 2025

(65) Prior Publication Data

US 2025/0181869 A1    Jun. 5, 2025

Related U.S. Application Data

(63) Continuation-in-part of application No. 18/605,962, filed on Mar. 15, 2024.

(60) Provisional application No. 63/551,757, filed on Feb. 9, 2024, provisional application No. 63/452,299, filed on Mar. 15, 2023.

(51) Int. Cl.
    *G06K 19/02*      (2006.01)
    *G06K 19/077*     (2006.01)

(52) U.S. Cl.
    CPC ..... *G06K 19/025* (2013.01); *G06K 19/07722* (2013.01); *G06K 19/07758* (2013.01)

(58) Field of Classification Search
    CPC .......... G06K 19/025; G06K 19/07722; G06K 19/07758

USPC ......................................................... 235/492
See application file for complete search history.

(56) References Cited

U.S. PATENT DOCUMENTS

| | | | |
|---|---|---|---|
| 6,451,154 B1 | 9/2002 | Grabau | |
| 6,648,232 B1 * | 11/2003 | Emmert | G06K 19/041 |
| | | | 235/492 |
| 2008/0198022 A1 | 8/2008 | Battles | |
| 2011/0017832 A1 | 1/2011 | Ritamaki | |
| 2015/0154489 A1 | 6/2015 | Dancausse | |
| 2015/0278671 A1 | 10/2015 | Martin | |
| 2016/0048751 A1 | 2/2016 | Imbruglio | |
| 2017/0337852 A1 | 11/2017 | Oster | |
| 2020/0210798 A1 * | 7/2020 | King | G06K 19/083 |
| 2023/0004771 A1 | 1/2023 | Kuechenthal | |
| 2023/0376716 A1 | 11/2023 | Schroer | |

\* cited by examiner

*Primary Examiner* — Ahshik Kim

(74) *Attorney, Agent, or Firm* — Bodman PLC

(57)      ABSTRACT

A high temperature radio frequency identification (RFID) tag assembly that includes: a base member made from a polyimide material; a radio frequency identification element attached to the base member, wherein the base member is configured to protect the radio frequency identification element from an inventory item at an elevated temperature above 400° F.; and an attachment component. The attachment component is coupled to the radio frequency identification element and the inventory item and configured to maintain a spacing of approximately 3 to 6 inches between the element and the inventor item. Further, the attachment component is a metal wire.

20 Claims, 8 Drawing Sheets

HIGH TEMPERATURE RFID TAG HOLDER AND ATTACHMENT COMPONENT

CROSS-REFERENCE TO RELATED APPLICATIONS

The subject application claims the benefit and priority under 35 U.S.C. § 119 of U.S. Provisional Patent Application No. 63/551,757, filed on Feb. 9, 2024, and, additionally, is a continuation-in-part application that claims the benefit and priority under 35 U.S.C. § 120 of U.S. Non-Provisional patent application Ser. No. 18/605,962, filed on Mar. 15, 2024, which claims the benefit and priority under 35 U.S.C. § 119 of U.S. Provisional Patent Application No. 63/452,299, filed on Mar. 15, 2023, the entire contents of which are incorporated by reference herein.

FIELD OF THE DISCLOSURE

The present disclosure generally relates to tags used to identify and locate inventory, particularly tags used to identify and locate inventory in high temperature settings and the holders used to secure the tags to the inventory. In addition, the present disclosure relates to a wire bolder for universally securing tags to inventory items.

BACKGROUND

It is known to use tags that attach to goods, inventory items, and assets, collectively referred to as items, for identification purposes. It is also known to use Radio Frequency Identification (RFID) tags in association with goods to electronically identify and track items. In addition, a system for affixing RFID and other identification tags to inventory items providing ease of viewing and desired spacing from the inventory items has not been developed.

When it comes to tagging items in high temperature environments and when the items themselves are at elevated temperatures there are several known types of tags that are used. Rigid plastic and ceramic tags, that are not printable using standard label printers, are known to be used in combination with RFID elements up to temperatures of approximately 400° F.

However, for temperature ranges 400° F. and above, it is known to use non-RFID metal tags to identify the items. Some disadvantages of this option include the high cost of the metal tags, as well as the high cost and specialized nature of the printers that are required to print on the metal tags. Further, conventional RFID tags are not used in association with inventory items or in environments where the temperature is greater than approximately 400° F.

Therefore, there is a need for a non-metal tag that is flexible, easily printable, and that can electronically identify and track inventory items with the use of an RFID element or inlay while being useable at both ambient temperatures and high temperatures greater than approximately 400° F. There is also a need to develop a system that cooperatively supports tags in a manner that renders the tags easily viewable while, when necessary, spaces the tags from high temperature inventory items.

SUMMARY

The present disclosure provides for affixing RFID tags to still-hot products, enabling real time tracking of the products from nearly the moment of release from a furnace or other manufacturing process that heats the products even up to 900° F. Therefore, manufactured products may now be tracked within a manufacturing facility even while hot. Further, the RFID tags of the present disclosure may stay with the manufactured products providing real time tracking even when the products have cooled, and even when they have been removed from the manufacturing facility.

According to one aspect of the disclosure, a high temperature radio frequency identification (RFID) tag component is disclosed. The RFID tag component includes a base member made from a polyimide material, and a radio frequency identification element attached to the base member.

In another aspect of the disclosure, a high temperature radio frequency identification tag component is disclosed. The high temperature radio frequency identification tag component includes a first base member extending between a first edge and a second edge, and a first radio frequency identification element attached to the first base member. The high temperature radio frequency identification tag component further includes a second base member extending between a first edge and a second edge and, a second radio frequency identification element attached to the second base member. The first edge of the second base member is coupled to the second edge of the first base member, and the first edge of the second base member and the second edge of the first base member are defined by perforations for separating the first base member from the second base member.

According to an aspect of the disclosure, a high temperature radio frequency identification (RFID) tag assembly is provided that includes: a base member made from a polyimide material; a radio frequency identification element attached to the base member, wherein the base member is configured to protect the radio frequency identification element from an inventory item at an elevated temperature above 400° F.; and an attachment component. The attachment component is coupled to the radio frequency identification element and the inventory item and configured to maintain a spacing of approximately 3 to 6 inches between the element and the inventory item. Further, the attachment component is a metal wire.

According to an aspect of the disclosure, a high temperature radio frequency identification (RFID) tag assembly is provided that includes: a base member made from a polyimide material; a radio frequency identification element attached to the base member, wherein the base member is configured to protect the radio frequency identification element from an inventory item at an elevated temperature above 400° F.; and an attachment component. The attachment component is coupled to the radio frequency identification element and the inventory item and configured to maintain a spacing of approximately 3 to 6 inches between the element and the inventory item. Further, the attachment component is a metal wire. In addition, the attachment component comprises a first end section, a second end section, and a central section between the end sections. The first end section comprises a bend and an intersection that couple the radio frequency identification element to the first end section. Further, the second end section comprises an elongated loop and an intersection that couple the inventory item to the second end section.

According to an aspect of the disclosure, a high temperature radio frequency identification (RFID) tag assembly is provided that includes: a base member made from a polyimide material; a radio frequency identification element attached to the base member, wherein the base member is configured to protect the radio frequency identification element from an inventory item at an elevated temperature above 400° F.; and an attachment component. The attachment component is coupled to the radio frequency identification element and the inventory item and configured to maintain a spacing of approximately 3 to 6 inches between the element and the inventory item. Further, the attachment component comprises a first end section, a second end section, and a central section between the end sections. In addition, the first end section comprises an elongated loop positioned at an angle of about 90 degrees with the central section and an intersection, wherein the loop and the intersection couple the radio frequency identification element to the first end section. Further, the second end section comprises an elongated loop and an intersection that couple the inventory item to the second end section.

Any of the above aspects can be combined in full or in part. Any features of the above aspects can be combined in full or in part. Any of the above implementations for any aspect can be combined with any other aspect. Any of the above implementations can be combined with any other implementation whether for the same aspect or a different aspect.

BRIEF DESCRIPTION OF THE DRAWINGS

Advantages of the present disclosure will be readily appreciated as the same becomes better understood by reference to the following detailed description when considered in connection with the accompanying drawings.

DETAILED DESCRIPTION

Referring to the Figures, wherein like numerals indicate like or corresponding parts throughout the several views, a high temperature RFID tag component is shown generally at

Figure 1:
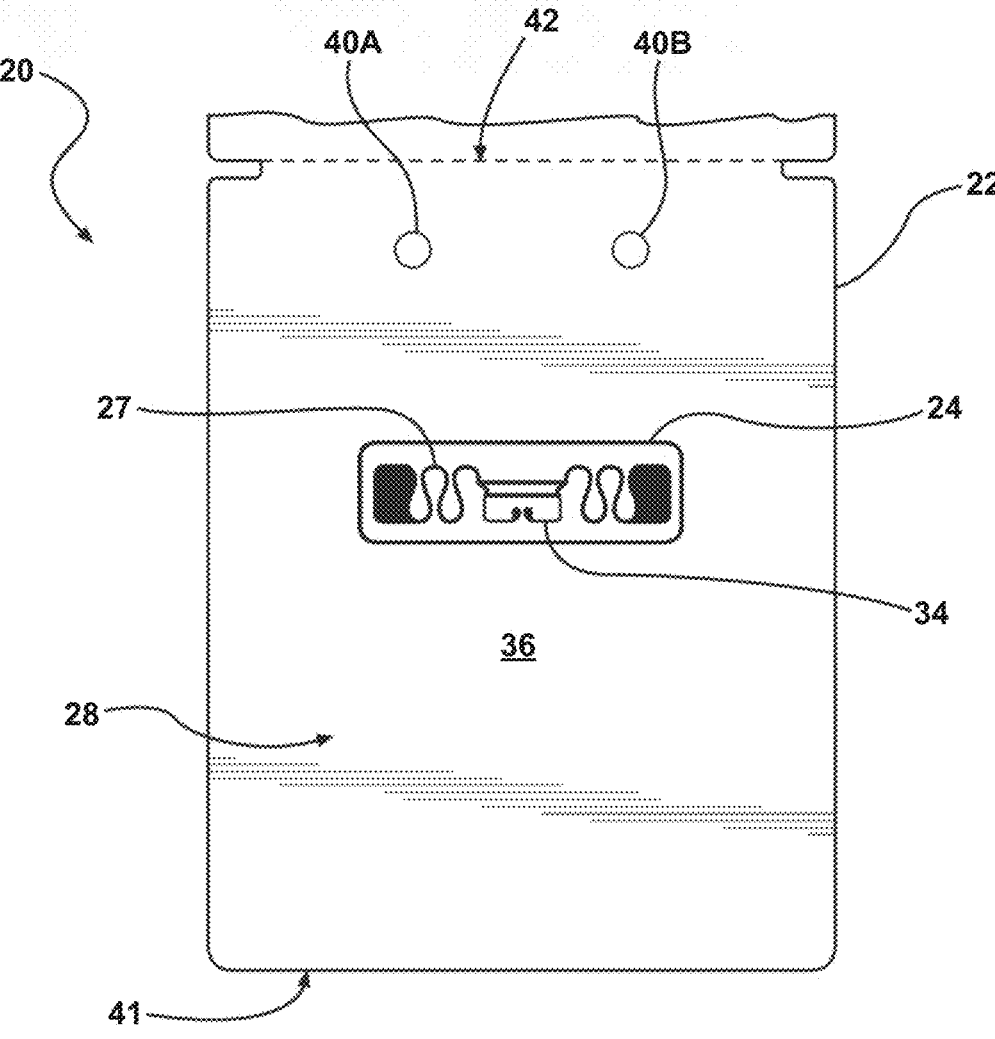
FIG. 1 is a rear view of an embodiment of a high temperature radio frequency identification tag component.
Figure 2:
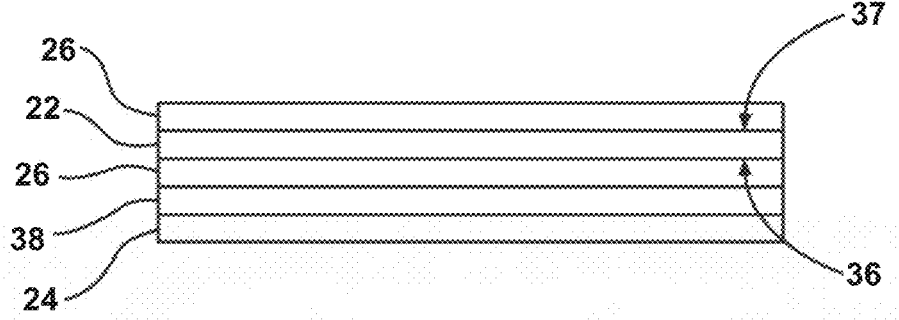
FIG. 2 is a schematic cross-section view of the radio frequency identification tag component of FIG. 1.

20. Referring to FIGS. 1 and 2, the high temperature RFID tag component 20 includes a base member 22 made from a polyimide material and an attached Radio Frequency Identification (RFID) element 24. The polyimide base member 22 is optionally coated with a printable coating 26. The polyimide material of the base member 22 is a class of heat-resistant polymers that include aliphatic, semi-aromatic, and aromatic variants. In one embodiment the polyimide material is a thermoplastic and in an alternative embodiment the polyimide material is thermosetting. It should be understood to those of skill in the art that polymers providing similar thermal and performance properties are also within the scope of this invention.

Figure 3:
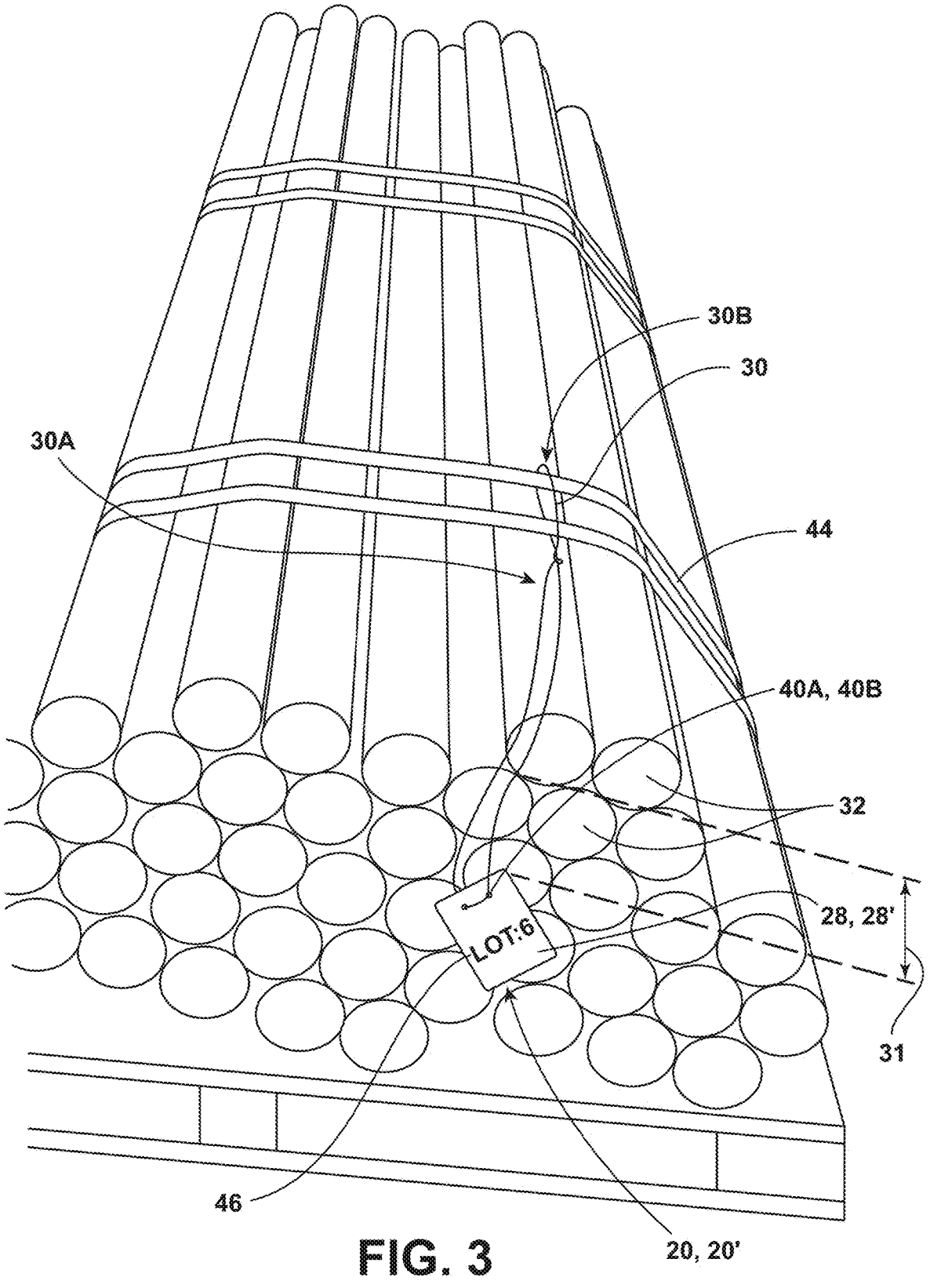
FIG. 3 is a perspective view of the high temperature radio frequency identification tag component illustrated in FIG. 1, as attached to an inventory item by an attachment component.

Referring now to FIG. 3, the polyimide base member 22, attached RFID element 24, and optional printable coating 26 together are referred to as the identification (ID) tag 28. Further, the high temperature RFID tag component 20 may further include an attachment component 30, for example a metal wire. The attachment component 30 is adapted for attachment to an inventory item 32 that may be at an elevated temperature, for example a bundle of newly formed steel bars or rolls. While RFID tags 28 are disclosed and described within the body of the present application, it should be understood by those of ordinary skill in the art that with respect to the wire and attachment component 30 described herein below that any tag (e.g., RFID tags, non-RFID metal tags, etc.) is within the scope of these embodiments, and that the RFID tags are merely exemplary of one embodiment.

Referring again to FIGS. 1 and 2, the base member 22 is made from a polyimide material that is flexible, can be cut to a desired shape and size, and able to withstand high temperatures, up to approximately 1100° F. In one embodiment, illustrated in FIG. 1, the base member 22 has a generally rectangular shape extending from a first edge 41 to a second edge 42. The base member 22 may measure approximately six inches long between the first edge 41 and the second edge 42, approximately 4.5 inches wide, and approximately 0.005 inches thick, having an area of approximately 27 inches square. Similarly, in one embodiment the RFID element 24 has a rectangular shape measuring approximately 2.5 inches wide and approximately 0.5 inches tall, with an area of approximately 1.25 inches square. In the embodiment shown here, the ratio of the area of the base member 22 to the area of the RFID element 24 is greater than 20:1. Ratios of the area of the base member 22 to the area of the RFID element 24 greater than 10:1 are further contemplated. The shape, dimensions, and orientation of this embodiment are not limiting. Therefore, it is within the scope of this invention for the base member to include other shapes, dimensions, and orientations.

Referring again to FIGS. 1 and 2, the RFID element 24 attached to the polyimide base member 22 may be a passive RFID element, which communicates via radio waves with a RFID reader (not illustrated) that is separate and remote from the RFID tag component 20. The RFID element 24 may further include an antenna 27 embedded in the passive RFID tag component 20, which receives a RF (radio frequency) signal from the RFID reader. When the antenna 27 receives the signal from the RFID reader, energy from the signal activates a circuit 34 within the RFID element 24, prompting a coded message to be transmitted from the RFID element 24 back to the RFID reader. The outgoing coded message includes specific information that can be read by the RFID reader. For example, the specific information may include a unique identifier, such as a serial number, or other data related to the inventory item 32 the RFID tag component 20 is attached to, such as a manufacturing date, a part number, an item quantity, or a batch number.

In one embodiment, as illustrated in FIGS. 1 and 2, the polyimide base member 22 includes a single piece of polyimide material having a first surface 36 and a second surface 37. The RFID element 24 may be attached to the first surface 36 of the single piece of polyimide material. The RFID element 24 may be attached using an adhesive 38. Alternatively, the RFID element 24 may be attached to the first surface 36 by other processes such as a fastener of an ultrasonic welding process. Optionally, the polyimide single piece may be coated on either the first surface 36 or the second surface 37 with a printable coating 26 prior to adhesion of the RFID element 24 onto the first surface 36 of the polyimide base member 22. The RFID element 24 may be attached to the first surface 36 of the polyimide material, which may be coated with a printable coating 26 by the adhesive 38. The adhesive 38 may be a high temperature adhesive that is resistant to breakdown and loss of adhesion.

Referring again to FIGS. 1 and 2, both the first surface 36 and the second surface 37 of the polyimide base member 22 can be coated with the printable coating 26. One of ordinary skill in the art will appreciate that the RFID element 24 could be adhered to the printable coating 26, or directly to the polyimide base member 22 as is desired by a given process. The printable coating 26 is an intermediate substrate that facilitates printing identifying markings on the RFID tag component 20 using a printing device (not shown). Due to the low surface energy of the polyimide construction, printing identifying markings or information directly on the base member 22 is difficult, and the addition of the printable coating 26 creates a surface that various printing processes can effectively mark.

Figure 4:
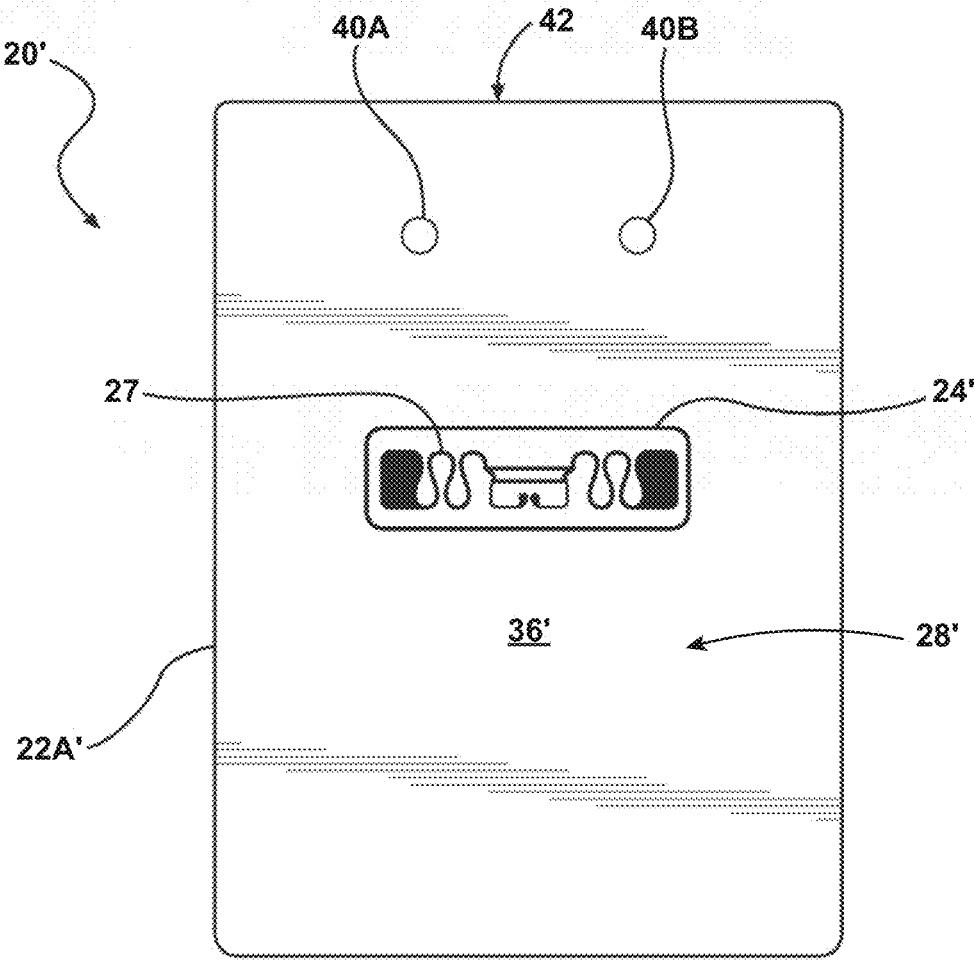
FIG. 4 is a rear view of another embodiment of a high temperature radio frequency identification tag component.
Figure 5:
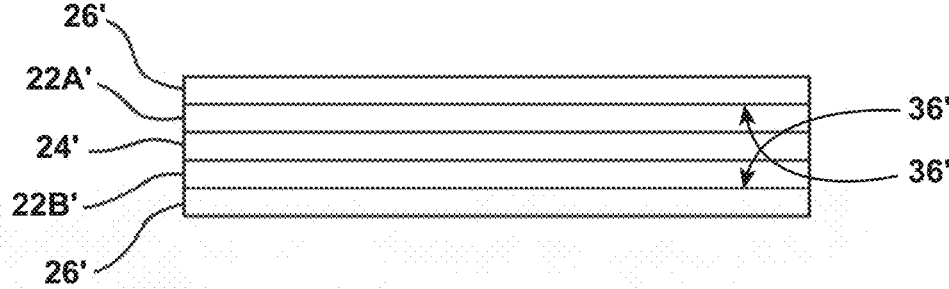
FIG. 5 is a schematic cross-section view of the radio frequency identification tag component of FIG. 4.

In another embodiment, illustrated in FIGS. 4 and 5, the high temperature RFID tag component, shown generally at 20', includes an RFID element 24' that is embedded between two pieces of the polyimide material 22A', 22B'. In this embodiment, the RFID element 24 may not be attached by an adhesive. Rather, the RFID tag 24' may become embedded between two pieces of polyimide material 22A', 22B' that are adhered together. Further, at least one exposed surface 36' of the polyimide material 22A', 22B' is coated with a printable coating 26'. In FIG. 5, both exposed surfaces 36' of each piece of polyimide material 22A', 22B' are coated with a printable coating 26'. The two pieces of polyimide material 22A', 22B', the embedded RFID element 24', and optional printable coating 26" together are referred to as the identification (ID) tag 28'.

In both embodiments depicted in FIGS. 1-2 and 4-5, the RFID tag 24, 24', respectively, is positioned generally centered on the respective polyimide base member 22, 22'. However, other arrangement and embodiments are contemplated, and the placement of the RFID tag on the polyimide base member 22, 22' is not limited to the generally centered arrangement shown in these figures.

With further regard to the embodiments depicted in FIGS. 1-2 and 4-5, the printable coating 26, 267, respectively, allows for information to be printed on the respective high temperature RFID tag component 20, 20' with the use of standard, known printing methods and machines. It should be appreciated that the addition of the printable coating 26' on both sides of the identification tag 28' facilitates printing identifying information on both sides of the identification tag 28'.

Referring to FIG. 3, the high temperature RFID tag component 20, 20' (see also FIGS. 1 and 4) further includes an attachment component 30. The attachment component 30 is used to attach the identification tag 28, 28' (see also FIGS. 1 and 4) to its associated inventory item 32. Referring to FIGS. 1 and 4, the identification tag 28, 28' defines two apertures 40A, 40B that receive the attachment component 30 for coupling the identification tag 28, 28' to the inventory item 32. The two apertures 40A, 40B may be spaced apart by approximately 1.5 inches and spaced approximately 0.5 inches from the second edge 42 of the identification tag 28, 28'. Each aperture 40A, 40B may have a diameter of approximately 0.25 inches.

In the exemplary embodiment shown in FIG. 3, the attachment component 30 may be a metal wire (e.g., as formed from a stainless steel). The two apertures 40A, 40B of the identification tag 28, 28' are configured to receive a first end 30A of the attachment component 30, e.g., a metal wire. The attachment component 30 is then twisted to secure the identification tag 28, 28' to the component 30, e.g., a metal wire. The opposite end 30B of the attachment component 30 is secured to its associated inventory item 32. The opposite end 30B of the attachment component 30 (e.g., a metal wire) may also be twisted to be secured to the inventory item 32. The specific dimensions regarding this embodiment of the attachment component 30 are not limiting. Therefore, it is within the scope of the present disclosure for the attachment component 30 to include other materials, shapes, dimensions, orientations, and attachment features. For example, the attachment component 30 may be implemented as a high temperature cable tie (i.e., a zip tie) formed from a stainless steel, or from a polyimide material. Further, the number of apertures (e.g., 40A, 40B, etc.) is not limiting, and it is within the scope of this invention for there to be only one aperture or more than two apertures.

Figure 6:
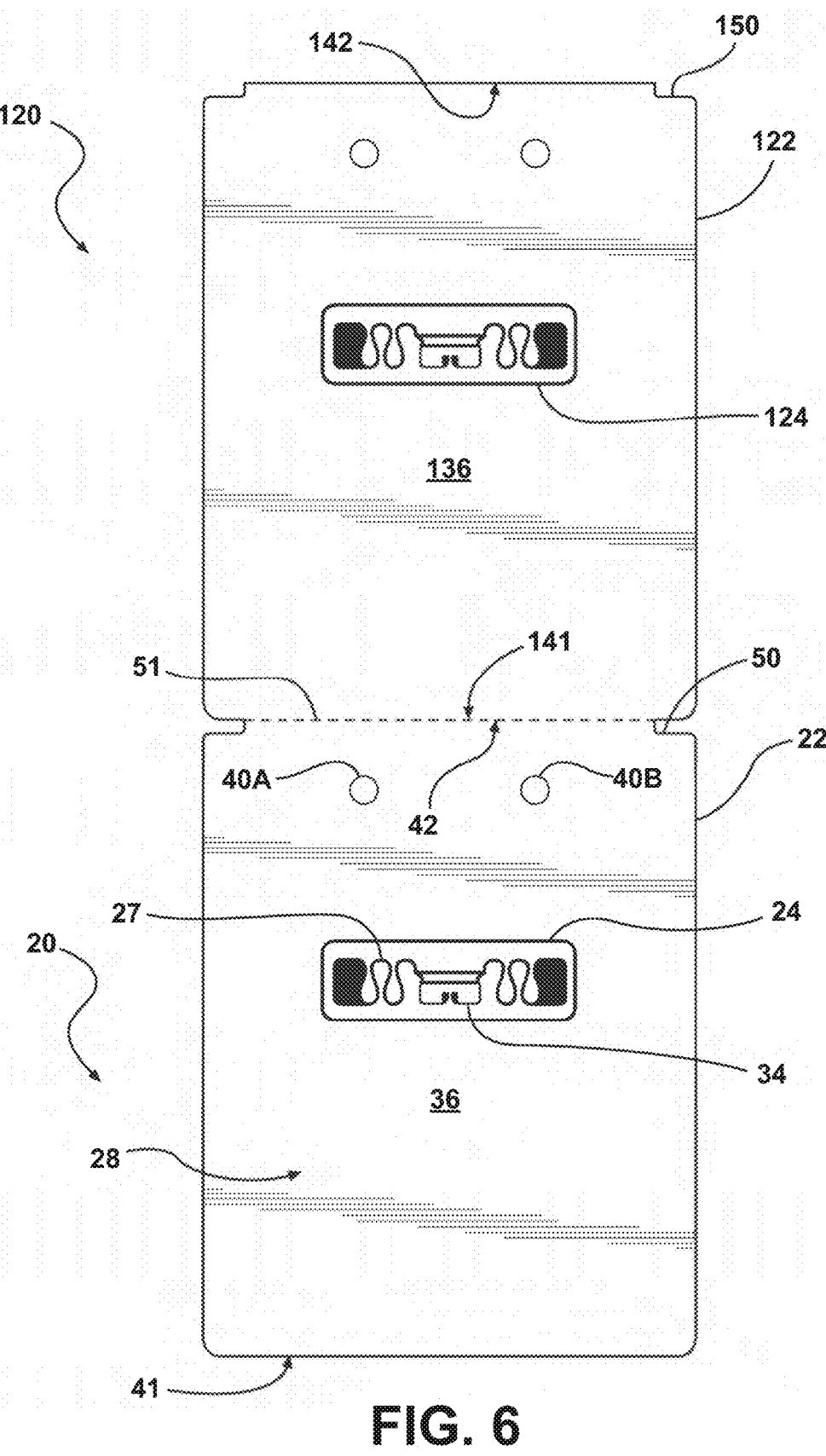
FIG. 6 is a rear view of two radio frequency identification tag components shown coupled to one another along one edge.

In some implementations of the high temperature RFID tag component 20, 20' depicted in FIGS. 1 and 4, more than one high temperature RFID tag component 20, 20' may be provided from a dispensing system and usable separately from each other. Referring now to FIG. 6, a first RFID tag component 20 (see FIG. 1) may be coupled to a second RFID tag component 120. As will be appreciated from the subsequent description below, the second RFID tag component 120 is similar to the first RFID tag component 20 described above in connection with FIGS. 1 and 2. As such, the components and structural features of the second RFID tag component 130 that are the same as, or that otherwise correspond to, the first RFID tag component 20 are provided with the same reference numerals increased by 100 (e.g., 20 and 120). It should be further appreciated that this description and arrangement of either or both of the first and second RFID tag components 20, 120, as shown in FIGS. 1-3, could be implemented with the second embodiment of the RFID tag component 20', as shown in FIG. 4-5.

Referring again to FIG. 3, each of the first RFID tag component 20 and the second RFID tag component 120 may include a base member 22, 122. More specifically, the first RFID tag component 20 includes a first base member 22 extending between the first edge 41 and the second edge 42, and the second RFID tag component 120 includes a second base member 122 extending between the first edge 141 and the second edge 142. A notch 50, 150 is defined in each of the first base member 22 and the second base member 122 adjacent to the respective second edge 42, 142. More specifically, the first base member 22 defines a first notch 50 adjacent to the second edge 42 and the second base member 122 defines a second notch 150 adjacent to the second edge 142. Here, each of the notches 50, 150 may be further defined as a pair of notches, with each notch of the pair of notches arranged on an opposing lateral side of the corresponding base member 22, 122.

As also shown in FIG. 3, in order to facilitate separating the first RFID tag component 20 from the second RFID tag component 120, the second edge 42 of the first base member 22 and the first edge 141 of the second base member 122 are defined by perforations 52. The perforations 52 facilitate tearing or ripping the base member 22 to separate the first RFID tag component 20 from the second RFID tag component 120. In this way, when the second edge 42 of the first base member 22 is separated from the first edge 141 of the second base member 122, the second edge 42 of the first base member 22 is a perforated edge.

In one example, the inventory item 32 may be a bundle of steel bars. After a coil, roll, rod, tube, plate, or bar of steel is newly formed and comes out of the furnace, it is at an elevated temperature, which may be as high as approximately 900° F. FIG. 3 shows several steel bars, designated as inventory item 32, that have been bundled together by a strap or band 44 while still at an elevated temperature. A high temperature RFID tag component 20, 20' is utilized to identify inventory item 32, the bundle of steel bars. Identification information 46 may be printed on the printable coating 26, 26' that covers the respective polyimide base member 22 or polyimide material 22A, 22B to enable visible identification of the inventory item 32, the bundle of steel bars. The identification information 46 may include information such as a batch number, a part number, a material specification, and dimensions of the steel bars that are bundled together. This information may additionally be stored on the RFID element 24, 24" (FIGS. 1 and 4) or stored in a database and correlated with a unique identifier of the RFID element 24, 24".

Referring again to FIG. 3, the first end 30A of the attachment component 30, which is shown here as a metal wire, is looped through the two apertures 40A, 40B and twisted to affix the identification tag 28, 28' to the attachment component 30. The second end 30B of the attachment component 30 is looped around the band 44 and twisted to affix the attachment component 30, and therefore the identification tag 28, 28', to the inventory item 32, e.g., the bundle of steel bars. As depicted in FIG. 3, the attachment component 30 is approximately 12 inches long, such that when the first end 30A and the second end 30B have been twisted as described above, there is a distance 31 within the range of approximately 3-6 inches between the inventory item 32 and the identification tag 28, 28'. In these embodiments, the distance 31 ensures that the identification tag 28, 28' is sufficiently spaced from the inventory item 32, which may be at an elevated temperature in excess of 400° F. to ensure safety of an operator handling the tag 28, 28' and no thermal degradation of the tag itself.

Furthermore, the high temperature RFID tag component 20, 20' (see FIGS. 1, 3 and 4) may also be attached to a container (not shown) that contains hot forged metal parts. The containers may be made from, including but limited to, metal (such as steel). The hot forged parts heat up the container in which they are held. Therefore, the containers require a tag that can withstand high heat. This type of container is an example of an "asset" that can be tagged and the metal parts within the container are examples of "inventory items". The high temperature RFID tag component 20, 20' can include information to identify the container, the inventory within the container, or both.

Figures 7, 8:
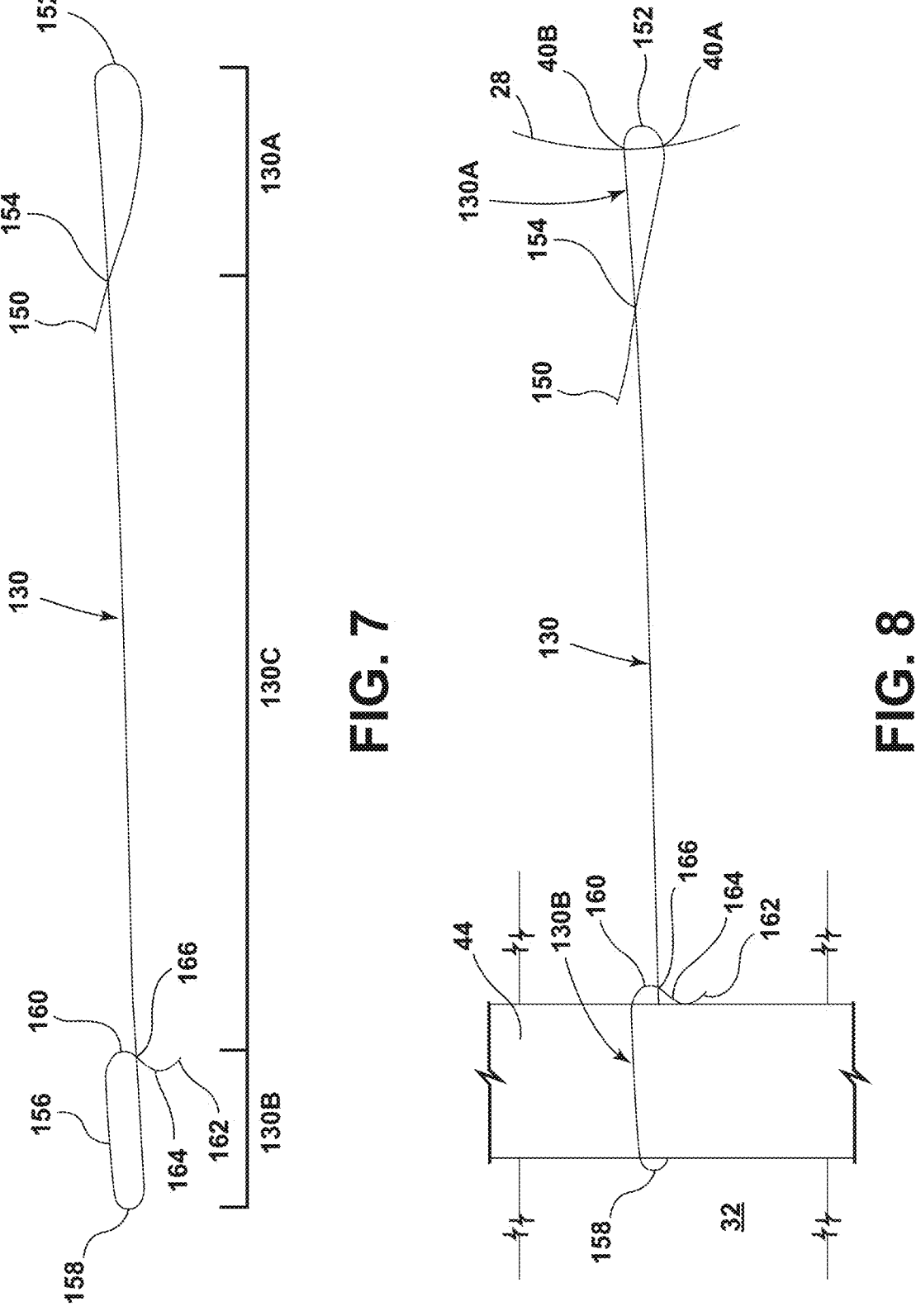
FIG. 7 is a top view of another embodiment of an attachment component.
FIG. 8 is a top view of the attachment component illustrated in FIG. 7, as attached to an inventory band.

According to an embodiment, FIGS. 7 and 8 depict an attachment component 130. The attachment component 130 is a rigid, metal wire. A first end section 130A of the attachment component 130 attaches to the tag component or identification tag 28, 28' (see also FIGS. 1, 3, and 5). Although identification tag 28 is illustrated in FIG. 8, the attachment component 130 can be attached to either identification tag 28, 28'. At the first end section 130A, the attachment component 130 (e.g., a rigid, metal wire) protrudes outwardly through one aperture 40B in the identification tag 28, includes a bend 152, and protrudes inwardly through the second aperture 40A. The bend 152 in the wire 130 is positioned between the two apertures 40A, 40B in the identification tag 28 to secure the identification tag 28 facing away from the inventory item 32 to which it is attached. The first distal end 150 of the wire 130 crosses over an inward, central section 130C of the attachment component 130 to form an intersection 154. The intersection 154 secures the tag component 28 in position and prevents it from slipping off the attachment component 130 (e.g., a rigid, metal wire).

Still referring to FIGS. 7 and 8, the second end section 130B of the attachment component 130 is attached to the inventory item 32 (see FIG. 3) by virtue of being attached directly to the band 44. At the second end section 130B, the wire 130 includes an elongated loop 156 that attaches to the inventory item 32. Advantageously, the second end section 130B of the attachment component 130 can be pre-arranged to facilitate connection to the inventory item 32 and band 44 by an operator without direct exposure of the operator to the elevated temperature associated with the item 32. For example, an operator could cast the second section 130B of the attachment component 130 over the band 44 coupled to the inventory item 32. Further, the distance 31 (see FIG. 3) between the tag 28 and the inventory item 32 also facilitates safety from thermal exposure from the inventory item 32. In this embodiment, the elongated loop 156 wraps around a band 44 that bundles together the inventory item 32. The elongated loop 156 includes a first bend 158 and a second bend 160 that are spaced apart. The first bend 158 is positioned more outwardly along the attachment component 130 than the second bend 160. The second distal end 162 of the attachment component 130 includes an S-shaped section 164 that crosses over and hooks around an inward section of the attachment component 130 to form an intersection 166. The intersection 166 secures the attachment component 130 to the band 44 that is strapped around the inventory items 32 while the S-shaped section 164 secures closure of the elongated loop 156 around the band.

Figures 9, 10:
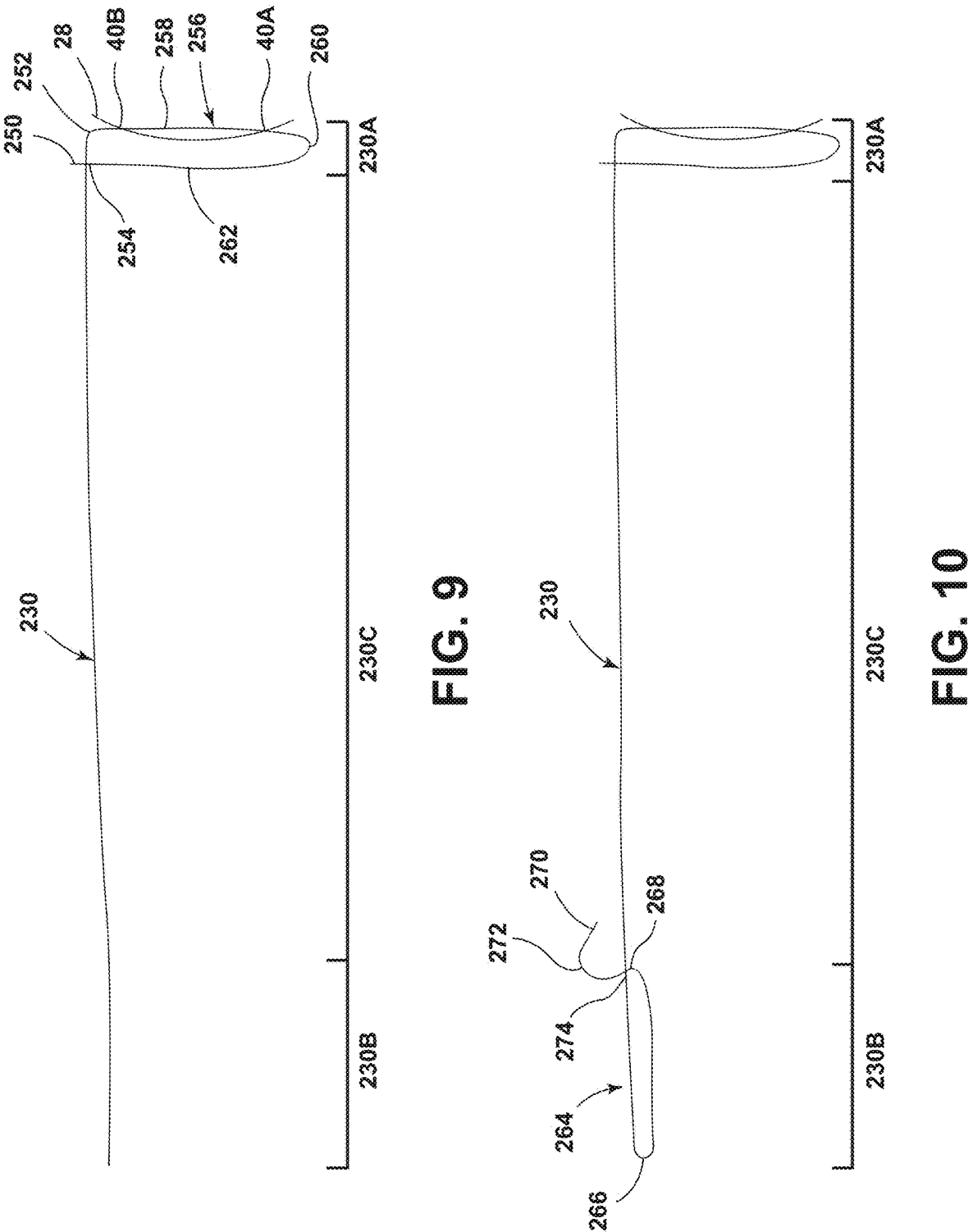
FIG. 9 is a top view of another embodiment of an attachment component.
FIG. 10 is a side view of the attachment component illustrated in FIG. 9.

According to an embodiment, FIGS. 9 and 10 illustrate an attachment component 230. The attachment component 230 is a rigid, metal wire. A first end section 230A of the attachment component 230 attaches to the tag component or identification tag 28. Although identification tag 28 is illustrated, the attachment component 230 can be attached to either identification tag 28, 28' (see FIGS. 3 and 5). At the first end section 230A, there is an elongated loop 256, viewed from above, that is positioned at approximately a 90-degree angle 252 from a center section 230C of the attachment component 230 (e.g., a rigid, metal wire). The elongated loop 256 includes a first parallel section 258, a bend 260, a second parallel section 262, and a first distal end 250 of the attachment component 230 that crosses over an inward section of the attachment component 230 to form an intersection 254. The two parallel sections 258, 262 are positioned parallel with respect to each other. The identification tag 28 is positioned along the first parallel section 258 with the attachment component 230 protruding outwardly through one aperture 40B in the identification tag 28 and the attachment component 230 protruding inwardly through the other aperture 40A in the identification tag 28. The intersection 254 secures the tag component 28 in position and prevents it from slipping off the end of the wire attachment component 230.

Still referring to FIGS. 9 and 10, the second end section 230B of the attachment component 230 attaches to the band 44 around the inventory item 32 (see FIG. 3). At the second end section 230B, the attachment component 230 includes an elongated loop 264 that attaches to the band 44 that wraps around or bundles together the inventory item or items 32. Advantageously, the second end section 230B of the attachment component 230 can be pre-arranged to facilitate connection to the inventory item 32 and band 44 by an operator without direct exposure of the operator to the elevated temperature associated with the item 32. For example, an operator could cast the second section 230B of the attachment component 230 over the band 44 coupled to the inventory item 32. Further, the distance 31 (see FIG. 3) between the tag 28 and the inventory item 32 also facilitates safety from thermal exposure from the inventory item 32. The elongated loop 264 includes a first bend 266 and a second bend 268 that are spaced apart. The first bend 266 is positioned more outwardly along the attachment component 230 than the second bend 268. The second distal end 270 of the attachment component 230 includes an S-shaped section 272 that crosses over an inward section of the attachment component 230 to form an intersection 274. The intersection 274 secures the attachment component 230 (e.g., a rigid, metal wire) to the band 44 that is strapped around the inventory item 32.

Figures 11, 12:
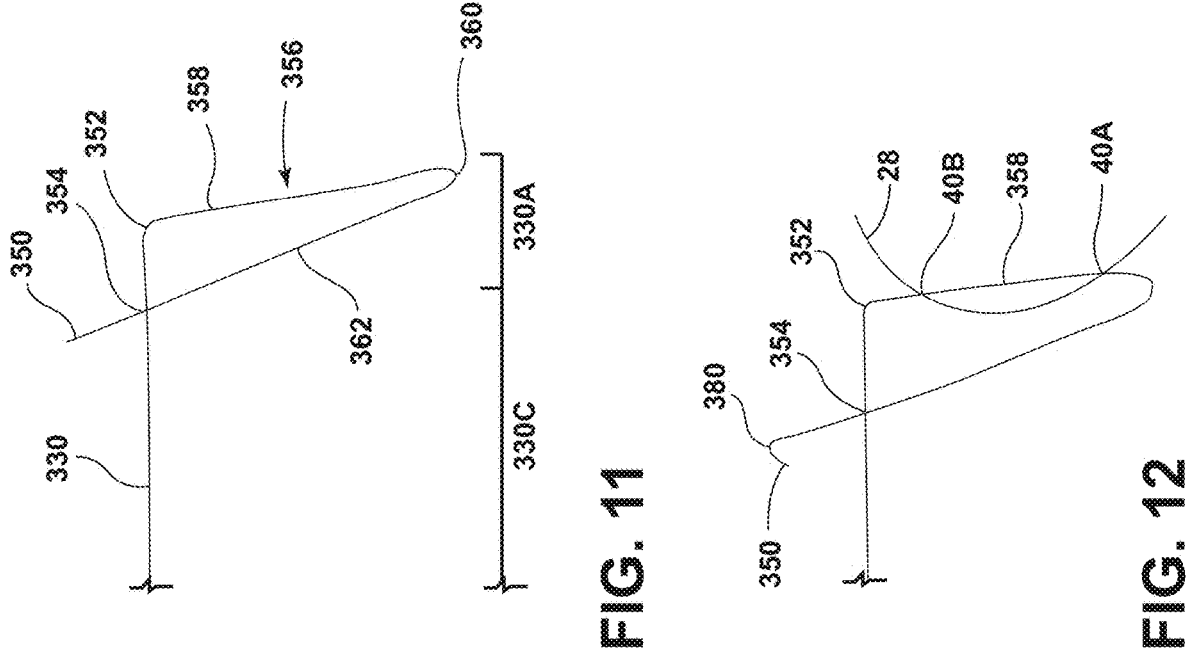
FIG. 11 is a top view of an embodiment of a first section of an attachment component.
FIG. 12 is a top view of the first section of the attachment component illustrated in FIG. 11, as including a curved distal end.

FIG. 11 depicts an embodiment of a first end section 330A of an attachment component 330, configured as a rigid, metal wire. In this embodiment, the first end section 330A of the attachment component 330 includes a generally triangular shaped elongated loop 356, viewed from above. The elongated loop 356 includes a first section 358, that is positioned at approximately a 90-degree angle 352 from a center section 330C of the attachment component 330. The elongated loop 356 further includes a bend 360, a second section 362, and a first distal end 350 of the attachment component 330 that crosses over an inward section of the attachment component 330 to form an intersection 354. The bend 360 may be greater than 90 degrees and less than 180 degrees. Referring to FIG. 12, the identification tag 28 is positioned along the first section 358 with the attachment component 330 protruding outwardly through one aperture 40B in the identification tag 28 and the attachment component 230 protruding inwardly through the other aperture 40A in the identification tag 28. The intersection 354 secures the tag component 28 in position and prevents it from slipping off the end of the wire attachment component 330. Further, FIG. 12 illustrates that the distal end 350 of the first end section 330A of the attachment component 330 may also further include an additional bend 380 at the end. Although the tag 28 is illustrated in FIG. 12, it would have the same orientation as the embodiment illustrated in FIG. 11. Further, identification tag 28', as shown in FIGS. 3 and 5, may also be used with attachment component 330.

Figures 13, 14:
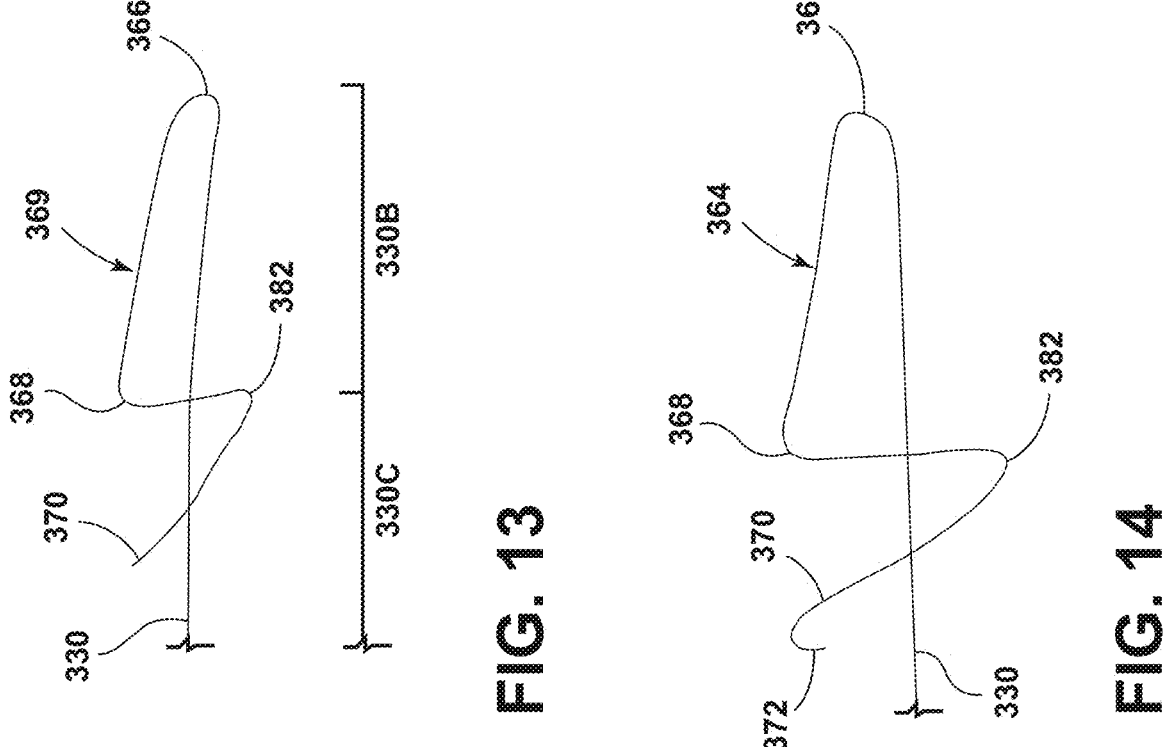
FIG. 13 is a top view of an embodiment of the second section of an attachment component.
FIG. 14 is a top view of the second section of the attachment component illustrated in FIG. 13, as including a curved distal end.

Referring to FIG. 13, an embodiment is illustrated of a second end section 330B of the attachment component 330 that attaches to the inventory item 32 (see FIG. 3). At the second end section 330B, the attachment component 330 includes a generally triangular elongated loop 364, viewed from above, that attaches to the band 44 (see FIG. 3) that wraps around or bundles together inventory item or items 32 (see FIG. 3). Advantageously, the second end section 330B of the attachment component 330 can be pre-arranged to facilitate connection to the inventory item 32 and band 44 by an operator without direct exposure of the operator to the elevated temperature associated with the item 32. For example, an operator could cast the second section 330B of the attachment component 330 over the band 44 coupled to the inventory item 32. Further, the distance 31 (see FIG. 3) between the tag 28 and the inventory item 32 also facilitates safety from thermal exposure from the inventory item 32. The elongated loop 364 includes a first bend 366, a second bend 368, and a third band 382 that are spaced apart. The first bend 366 is positioned more outwardly along the attachment component 330 than the second bend 368 and the third bend 382. The second bend 368 and the third bend 382 are approximately positioned at the same distance from first bend 366 and from a top view are positioned on either side of a center section 330C. As illustrated in FIG. 14, the second distal end 370 of the second end section 330B of the attachment component 330 may also include an additional bend 372.

It is important to note that each of the first end section 330A embodiments described above (see FIGS. 11 and 12) are interchangeable with each of the second end section 330B embodiments described above (see FIGS. 13 and 14). Furthermore, the attachment component 30, 130, 230, 330 (e.g., configured as a rigid, metal wire) may be used with any type of tag whether heat resistant, RFID or merely viewable. The attachment components of the present disclosure improve useability of various types of tags, e.g., identification tags 28, 28' (see FIGS. 1, 3 and 5) for identifying and tracking inventory items, e.g., inventory items 32, within a manufacturing facility, during shipment, or at final destination to improve inventory management.

Several instances have been discussed in the foregoing description. However, the aspects discussed herein are not intended to be exhaustive or limit the disclosure to any particular form. Various modifications to these aspects will be readily apparent to those skilled in the art, and the generic principles defined herein may be applied to other aspects without departing from the scope of the disclosure. The terminology that has been used is intended to be in the nature of words of description rather than of limitation. Many modifications and variations are possible in light of the above teachings and the disclosure may be practiced otherwise than as specifically described.

What is claimed is:

1. A high temperature radio frequency identification (RFID) tag assembly, comprising:
   a base member made from a polyimide material;
   a radio frequency identification element attached to the base member, wherein the base member is configured to protect the radio frequency identification element from an inventory item at an elevated temperature above 400° F.; and
   an attachment component, wherein the attachment component is coupled to the radio frequency identification element and the inventory item and configured to maintain a spacing of approximately 3 to 6 inches between the element and the inventory item, and
   wherein the attachment component is configured to maintain disposition of the polyimide material between the RFID tag and the inventory element.

2. The RFID tag assembly of claim 1, wherein the base member comprises a single layer of polyimide material and the radio frequency identification element is attached to a surface of the layer of polyimide material with an adhesive.

3. The RFID tag assembly of claim 2, further comprising a printable coating being disposed between the radio frequency identification element and the single layer of polyimide material.

4. The RFID tag assembly of claim 1, wherein the base member comprises two layers of polyimide material and the radio frequency identification element is embedded between the two layers of polyimide material, and further wherein the two layers of polyimide material are adhered together.

5. The RFID tag assembly of claim 4, further comprising a printable coating being disposed on an exposed surface of one or both of the two layers of polyimide material.

6. A high temperature radio frequency identification (RFID) tag assembly, comprising:
  a base member made from a polyimide material;
  a radio frequency identification element attached to the base member, wherein the base member is configured to protect the radio frequency identification element from an inventory item at an elevated temperature above 400° F.; and
  an attachment component, wherein the attachment component is coupled to the radio frequency identification element and the inventory item and configured to maintain a spacing of approximately 3 to 6 inches between the element and the inventory item,
  wherein the attachment component is a metal wire,
  wherein the attachment component comprises a first end section, a second end section, and a central section between the end sections,
  wherein the first end section comprises a bend and an intersection that couple the radio frequency identification element to the first end section, and
  further wherein the second end section comprises an elongated loop and an intersection that couple the inventory item to the second end section.

7. The RFID tag assembly of claim 6, wherein the base member comprises a single layer of polyimide material and the radio frequency identification element is attached to a surface of the layer of polyimide material with an adhesive.

8. The RFID tag assembly of claim 7, further comprising a printable coating being disposed between the radio frequency identification element and the single layer of polyimide material.

9. The RFID tag assembly of claim 6, wherein the base member comprises two layers of polyimide material and the radio frequency identification element is embedded between the two layers of polyimide material, and further wherein the two layers of polyimide material are adhered together.

10. The RFID tag assembly of claim 9, further comprising a printable coating being disposed on an exposed surface of one or both of the two layers of polyimide material.

11. The RFID tag assembly of claim 6, further comprising a first distal end of the first end section crossing over the central section to define the intersection.

12. The RFID tag assembly of claim 11, wherein the first distal end of the first end section further comprises a distal end bend.

13. The RFIP tag assembly of claim 12, wherein the elongated loop of the second end section is a generally triangular elongated loop.

14. The RFIP tag assembly of claim 13, wherein the generally triangular elongated loop comprises a first bend, a second bend, and a third bend, each of the bends spaced apart from one another.

15. A high temperature radio frequency identification (RFID) tag assembly, comprising:
  a base member made from a polyimide material;
  a radio frequency identification element attached to the base member, wherein the base member is configured to protect the radio frequency identification element from an inventory item at an elevated temperature above 400° F.; and
  an attachment component, wherein the attachment component is coupled to the radio frequency identification element and the inventory item and configured to maintain a spacing of approximately 3 to 6 inches between the element and the inventory item,
  wherein the attachment component is a metal wire,
  wherein the attachment component comprises a first end section, a second end section, and a central section between the end sections,
  wherein the first end section comprises an elongated loop positioned at an angle of about 90 degrees with the central section and an intersection, wherein the loop and the intersection couple the radio frequency identification element to the first end section, and
  further wherein the second end section comprises an elongated loop and an intersection that couple the inventory item to the second end section.

16. The RFID tag assembly of claim 15, wherein the base member comprises a single layer of polyimide material and the radio frequency identification element is attached to a surface of the layer of polyimide material with an adhesive.

17. The RFID tag assembly of claim 16, further comprising a printable coating being disposed between the radio frequency identification element and the single layer of polyimide material.

18. The RFID tag assembly of claim 15, wherein the base member comprises two layers of polyimide material and the radio frequency identification element is embedded between the two layers of polyimide material, and further wherein the two layers of polyimide material are adhered together.

19. The RFID tag assembly of claim 18, further comprising a printable coating being disposed on an exposed surface of one or both of the two layers of polyimide material.

20. The RFID tag assembly of claim 15, wherein the elongated loop further comprises a first parallel section, a bend, a second parallel section, and a first distal end, wherein the first distal end crosses over the metal wire of the first end section at the intersection.

* * * * *